(12) United States Patent
Andrews et al.

(10) Patent No.: US 7,298,719 B2
(45) Date of Patent: Nov. 20, 2007

(54) METHOD FOR SCHEDULING WIRELESS DOWNLINK TRANSMISSIONS SUBJECT TO RATE CONSTRAINTS

(75) Inventors: Daniel Matthew Andrews, New Providence, NJ (US); Lijun Qian, Piscataway, NJ (US); Aleksandr Stolyar, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 944 days.

(21) Appl. No.: 10/122,660

(22) Filed: Apr. 15, 2002

(65) Prior Publication Data

US 2003/0193906 A1     Oct. 16, 2003

(51) Int. Cl.
*H04Q 7/00* (2006.01)
(52) U.S. Cl. ........................... 370/329; 370/468
(58) Field of Classification Search ........... 370/329
See application file for complete search history.

(56) References Cited

U.S. PATENT DOCUMENTS

| | | | |
|---|---|---|---|
| 6,229,795 B1 | 5/2001 | Pankaj et al. | 370/329 |
| 6,807,426 B2 * | 10/2004 | Pankaj | 455/453 |
| 6,917,812 B2 * | 7/2005 | Damnjanovic | 455/452.2 |
| 6,985,462 B2 * | 1/2006 | Hosein | 370/329 |
| 6,987,819 B2 * | 1/2006 | Thomas et al. | 375/342 |
| 6,993,006 B2 * | 1/2006 | Pankaj | 370/342 |

OTHER PUBLICATIONS

A. Jalai, et al., "Data Throughput of CDMA-HDR, a High Efficiency Data Rate Personal Communication Wireless System," Proc. Vehicular Technology Conference VTC 2000, IEEE (2000) 1854-1858.

* cited by examiner

*Primary Examiner*—Huy D. Vu
*Assistant Examiner*—Toan Nguyen
(74) *Attorney, Agent, or Firm*—Martin I Finston

(57) ABSTRACT

A new approach is described for scheduling uplink or downlink transmissions in a network having remote terminals communicating with a central hub. The scheduler keeps track of a token count. The token count for a given remote terminal is incremented by a target amount in each pertinent timeslot, but is also decremented each time that the remote terminal is served. The amount of the decrement for one timeslot is the amount of data served, i.e., transmitted to or from the remote terminal, in that timeslot. In exemplary embodiments of the invention, the target amount by which T is incremented depends on the current value of T. Whenever the token count is non-negative (i.e., whenever it has a positive or zero value), the target amount is a desired floor, or lower limit, on an average amount of data delivered to or from the given remote terminal in one timeslot. Whenever the token count is negative, the target amount is a desired ceiling, or upper limit, on the same average amount of data delivered. In each timeslot, each remote terminal is assigned a weight proportional to a product of at least two factors: a function relating the individual remote terminal to overall network performance, and at least one increasing function of the token count. Each time a scheduling decision is made, the scheduler selects for service that remote terminal having the highest weight.

15 Claims, 2 Drawing Sheets

METHOD FOR SCHEDULING WIRELESS DOWNLINK TRANSMISSIONS SUBJECT TO RATE CONSTRAINTS

TECHNICAL FIELD

This invention relates to the scheduling of communicative transactions between a central hub in a communication system, and remote terminals that are served by the hub. More particularly, the invention relates to scheduling downlink transmissions from a base station to mobile stations of a wireless communication system.

BACKGROUND OF THE INVENTION

Many communication networks include an arrangement in which a centralized node, or "hub," communicates with a group of non-centralized terminals, which are here referred to as "remote terminals." If the remote terminals communicate with the hub over a common channel, it is possible for the communications between one remote terminal and the hub to interfere with communications between other remote terminals and the hub. To prevent such interference, it is often desirable to employ the techniques of time-division multiplexing. According to such techniques, each remote terminal has an assigned timeslot during which it may communicate with the hub by sending or receiving transmissions without interference from competing remote terminals within the group.

In some fields, the process of determining which remote terminal should be assigned a given timeslot is referred to as "scheduling." That terminology will be adopted here. Similarly, an entity, typically resident at the hub, that makes the scheduling determination for each timeslot will be referred to here as a "scheduler."

The simplest form of scheduling is "round robin" scheduling, in which the remote terminals are scheduled in a fixed order, and typically for equal durations. The scheduler repeatedly cycles through the remote terminals in the fixed order.

Although useful, round robin scheduling suffers from certain drawbacks. One such drawback is conveniently described with reference to the specific case of forward, or "downlink," transmissions from a base station to mobile stations of a cellular network.

The maximum rate at which a mobile station can receive data from the base station, without exceeding a given error rate, is limited by interference and noise, and by the received signal strength at the current location of the mobile station. Typically, the ratio of signal strength to the combined noise and interference, often referred to as the "signal to interference plus noise ratio" SINR, is greatest near the center of a cell and lowest near the margins of the cell. The SINR also fluctuates over time.

At any given time, then, some mobile stations will be able to receive data at higher rates than others. By favoring those mobile stations having the highest SINR for receiving downlink transmissions, the scheduler can drive up the throughput of the system; i.e., the long-term average amount of downlink data transmitted per unit time.

If, for example, the revenue collected by the network operator depends upon throughput, it is desirable to drive the throughput as high as possible. However, a scheduler that always favors those mobiles having the highest SINR will tend to deny service to mobiles having low SINR. As a consequence, users will experience intolerable service interruptions, and will be dissatisfied.

Those skilled in the art have recognized the need to balance throughput against "fairness;" i.e., against the need to assure that service to each mobile station, or other remote terminal, is scheduled often enough to satisfy all of the users.

This necessity is discussed, for example, in U.S. Pat. No. 6,229,795, which issued on May 8, 2001 to R. Pankaj et al. (the '795 patent). The '795 patent describes a cellular system for high-rate packet-data transmission, in which the downlink has a variable rate of data transmission. The scheduling of individual remote terminals is based on a weight assigned to each remote terminal. At the base station, a scheduler uses these weights to make scheduling decisions. A scheduling algorithm is used that aims to balance the competing objectives of throughput and fairness.

According to that algorithm described in the '795 patent, a threshold is computed by averaging the instantaneous downlink data-transmission rates for all mobile stations that have queued data waiting at the base station. If the instantaneous transmission rate for a given mobile station exceeds the threshold, the weight for that mobile station is incremented by a step. If the instantaneous transmission rate for that mobile station falls below the threshold, the corresponding weight is incremented by a larger step.

Another algorithm, which also seeks to balance throughput against fairness, is the well-known Proportional Fair Scheduling algorithm. Proportional Fair scheduling is discussed, for example, in A. Jalali, et al., "Data Throughput of CDMA-HDR, a High Efficiency Data Rate Personal Communication Wireless System," *Proc. Vehicular Technology Conference VTC* 2000, IEEE (2000) 1854-1858.

In Proportional Fair scheduling, the scheduler keeps track of two values, in particular, for each remote terminal: DRC and R. On the downlink of a wireless network, for example, each remote terminal will estimate its SINR for the next timeslot, and on that basis will select a rate for transmission of downlink data from the base station. The selection will typically be the highest available rate consistent with a specified frame error rate, or other such error rate. The transmission rate requested by a given remote terminal in a given timeslot is DRC.

The second value, R, is the rate at which a given remote terminal has received data from the base station, or other hub, as averaged by an appropriate procedure such as exponentially weighted averaging using a desired time constant.

In each timeslot n, the Proportional Fair scheduler will serve that remote terminal for which the ratio $$\frac{DRC}{R}$$

is greatest. Thus, each remote terminal tends to receive service in those timeslots where its requested rate is highest—not in an absolute sense, but, rather, highest relative to the average rate at which that particular remote terminal has been receiving data in the recent past. Because that average rate will be small for underserved remote terminals, even a remote terminal with a poor channel will eventually be served. That is, the average rates are dynamic quantities, and they will converge toward a condition in which each remote terminal is served reasonably often.

In addition to achieving a balance between throughput and fairness, the Proportional Fair algorithm is attractive because it can be mathematically demonstrated that the long-term throughput achieved using that algorithm, over all remote terminals, satisfies an optimality condition.

However, the Proportional Fair algorithm, among others, does not place any floor or ceiling on the amount of service that a given remote terminal will receive. There remains a need for algorithms that can impose such floors or ceilings, so that, for example, users can contract for different guaranteed levels of service. In particular, there is a need for an efficient scheduling algorithm that seeks to optimize performance according to some measure subject to the imposition of floors, or of floors and ceilings, on the average rates of service to individual terminals.

SUMMARY OF THE INVENTION

We have discovered a new approach to the scheduling problem that involves such algorithms. In our approach, the scheduler keeps track of a variable which we refer to as the "token count" T. The token count for a given remote terminal is incremented by a target amount in each pertinent timeslot, but is also decremented each time that the remote terminal is served. The amount of the decrement for one timeslot is the amount of data served, i.e., transmitted to or from the remote terminal, in that timeslot. "Service" in this regard may refer to either uplink or downlink transmission.

In exemplary embodiments of the invention, the target amount by which T is incremented depends on the current value of T. Whenever the token count is non-negative (i.e., whenever it has a positive or zero value), the target amount is a desired floor, or lower limit, on an average amount of data delivered to or from the given remote terminal in one timeslot. Whenever the token count is negative, the target amount is a desired ceiling, or upper limit, on the same average amount of data delivered. Moreover, whenever incrementing T would cause T to go from a negative to a positive value, we have found it advantageous in at least some cases to reset T to zero instead.

In each timeslot, a weight is assigned to each remote terminal. The weight is proportional to a product of at least two factors: a function relating the individual remote terminal to overall network performance, and at least one increasing function of the token count. As in the Proportional Fair algorithm, each time a scheduling decision is made, the scheduler selects for service that remote terminal having the highest weight.

In specific embodiments, our invention involves a modification of the Proportional Fair algorithm. To implement our modified algorithm, the scheduler must keep track of DRC and R for each remote terminal and each timeslot, as explained above, and must also keep track of the "token count" T. Although DRC and R have been illustrated above in terms of rates of downlink transmission, it should be noted that they can equally well represent rates of uplink transmission in appropriate communication networks. In each timeslot, the weight assigned to each remote terminal is proportional to the ratio $$\frac{DRC}{R},$$

described above, multiplied by an increasing function of the token count. That is, $$\frac{DRC}{R}$$

is one example of a function, referred to above, relating the individual remote terminal to overall network performance.

DETAILED DESCRIPTION

Initially, it should be noted that it is convenient to adopt a convention in which transmission rates are expressed in bits per timeslot, because under such a convention, the amount of data delivered in a given timeslot is numerically equal to the rate over that timeslot. We will adopt that convention in the following discussion. Accordingly, it should be borne in mind that when the amount of data served or the token count is said to be incremented or decremented by a "rate," what is actually meant is the amount of data delivered at that rate in one timeslot.

Our scheduling method has specific applications to the scheduling of packet transmissions from a base station to mobile stations of a CDMA network. Accordingly, the illustrative embodiment described below is implemented by a scheduler in such a network. However, our scheduling method is more general in its range of applicability, and we envisage other useful applications in communication networks of other kinds, including both wired and wireless networks. In particular, our method is applicable not only for scheduling downlink transmissions, but also for scheduling uplink transmissions in a CDMA or other wireless network.

In the case of uplink scheduling, the queues to be served will reside in the individual mobile stations rather than in the base station, and the mobile station will report both channel information and the queue length to the base station at prescribed times. In one approach, the mobile station reports channel information by sending pilot signals to the base station. From the pilot signals, the base station evaluates the channel conditions and selects an appropriate DRC accordingly. In one of various alternative approaches, the mobile station uses a downlink signal to estimate the quality of the uplink channel, and sends a corresponding DRC back to the base station.

Figure 1:
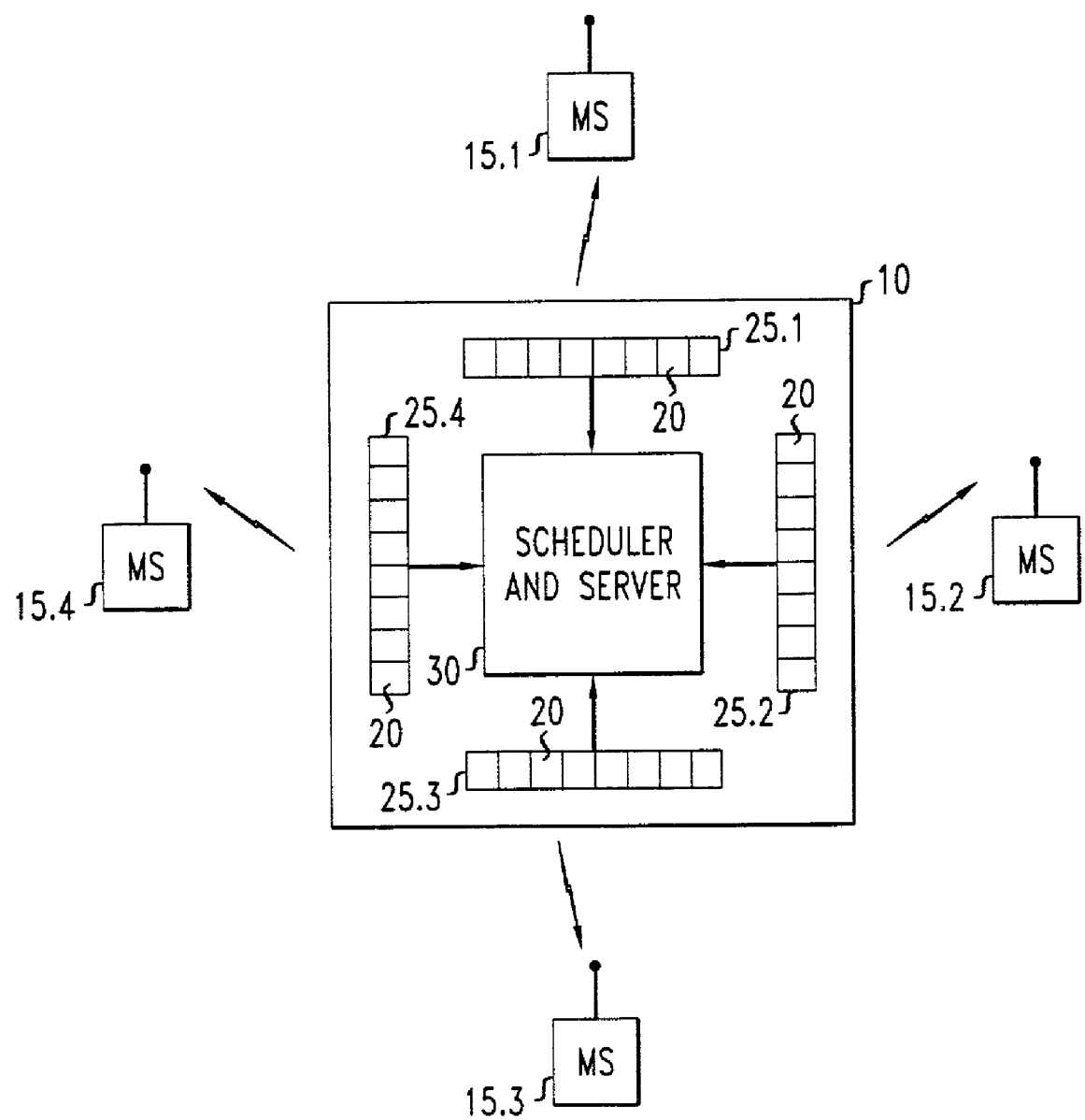
FIG. 1 is a simplified schematic drawing of a cell of a wireless communication system, including mobile stations, a base station, and queues of buffered packets within the base station.

With reference to FIG. 1, element 10 represents a base station serving mobile stations (more generally, "users") 15.1-15.4 within its cell or local reception area. Incoming packets 20 destined for the mobile stations are queued, while awaiting service, in buffers 25.1-25.4, each buffer corresponding to a respective mobile station. Separate buffers are shown for convenience; actual implementations may employ a single buffer, with appropriate logical demarcations of the respective queues. Scheduler 30 within base station 10, or otherwise associated with it, schedules the respective queues for service, and serves the packets of each queue by transmitting them to the destined mobile station.

The queue associated with only one mobile station is served in each scheduling interval. However, a packet may extend over more than one timeslot. For example, a CDMA network might permit packets to occupy anywhere from one to sixteen timeslots, depending on the rate of data transmission. Typically, once a mobile station has been selected for service, a sequence of timeslots will be scheduled for the mobile station, and it will continue to be served in each scheduled timeslot until the entire packet has been transmitted. Thus, the scheduling decisions will typically be made only in timeslots that have not already been scheduled.

A typical base station will have available a discrete set of available rates for transmitting data to the mobile stations. Packets will typically be sent to the served mobile station at the maximum acceptable rate from the set of rates that are available. Each rate will have a minimum power requirement dictated, at least in part, by channel conditions, interference conditions, and noise. Thus, the maximum acceptable rate will be the greatest rate whose power requirement can be met in view of total transmit power available, the possible need to reduce interference in neighboring cells, concurrent demands for transmit power by, e.g., network management and control signals, and the specified rate of errors, such as frame errors, that is deemed acceptable.

It is typical in CDMA systems, among others, for the mobile stations to send periodic signals to the base station that contain indications of channel quality. Such signals generally include an indication of the current SINR for signals received at the mobile station from the base station. Additionally, or alternatively, these signals indicate the data rate achievable on the downlink at, e.g., maximum transmit power. In the following description, we will assume that each mobile station sends an indication of the current SINR to the base station in each timeslot.

Timeslots are advantageously made short enough that channel conditions can be assumed constant over the duration of one timeslot. Channel fluctuations are caused by fading effects, which tend to be manifested on both a short time scale having a characteristic interval of several milliseconds, and on a longer timescale, having a characteristic interval of seconds, or even tens of seconds. The rapidly fluctuating effects are often referred to as "fast fading," and the slowly fluctuating effects, which may be due, inter alia, to user mobility, are often referred to as "shadow fading."

An exemplary scheduling interval capable of substantially following fast fading effects is 1.67 ms, although intervals as small as 0.5 ms or less and as large as 5 ms or more, are also useful for such purpose.

An illustrative sequence of steps performed by the scheduler during the n'th timeslot will now be described with reference to FIG. 2. It should be noted that the particular sequence to be described is meant to be illustrative only, and not limiting as to the scope of the invention. The specific computational steps that are described will typically be carried out by a programmable digital signal processor (DSP), but provided that sufficient processing speed is available, they can equivalently be carried out by any general-purpose or special-purpose digital computing device operating under the control of an appropriate software, hardware, or firmware program. Those skilled in the art will appreciate that the specific computational results to be achieved may be reached by any of numerous combinations of mathematical steps. All such combinations of mathematical steps are deemed equivalents for purposes of the present invention.

At block 50, the scheduler obtains a DRC, denoted $DRC_i(n)$, from each remote terminal. Here, the integer n indexes the timeslots, and the interger i indexes the respective remote terminals. The DRC indicates to the base station which of the available discrete data transmission rates is requested by the remote terminal for the current timeslot. Typically, the DRC is a four-bit control sequence, the "Data Rate Control" sequence.

At block 60, the scheduler obtains the parameters $R_i(n)$ and $T_i(n)$ from memory locations, which exemplarily reside at the base station. As noted above, $R_i(n)$ is an average rate at which a given remote terminal has received data from the base station, and $T_i(n)$ is a token count. Details of the computations that update $R_i(n)$ and $T_i(n)$ are discussed below. At startup, $T_i(n)$ will typically be initialized to zero, and $R_i(n)$ will typically be initialized to a fraction f of $DRC_i(n)$; i.e., to $f \cdot DRC_i(n)$. The fraction f is, for example, 0.1. In another example, 1/f is an estimate of the current number of active users.

At block 70, the weight $W_i(n)$ is computed for each of the remote terminals. For the i'th remote terminal, in timeslot n, the weight is defined by:

$$W_i(n) = \frac{DRC_i(n)}{R_i(n)} e^{a_i T_i(n)}.$$

In the above expression, $a_i$ is an adjustable parameter, which may be set differently for each remote terminal. The parameter $a_i$ affects the timescale over which the actual rate of service will tend to track the target rate or rates.

A typical value for $$\frac{1}{a_i}$$

is given by the product of the target minimum average transmission rate, multiplied by the time constant τ for exponentially weighted averaging of the transmission rate. Exponentially weighted averaging is discussed below. A typical value for the target minimum rate in CDMA systems is 9.6 kbit per sec., or 16 bits per timeslot. An alternative, typical value is 28.8 kbit per sec., or 48 bits per timeslot.

The exponential function that multiples the DRC/R ratio is one example of an increasing function of the token count $T_i(n)$. Other increasing functions of the token count may also be used to multiply the DRC/R ratio. Particularly desirable are functions that are convex because with such functions, the relative impact of the token count on the behavior of the system grows as the token count grows. The exponential function is advantageous because, among other things, it is conveniently implemented.

At block 80, that remote terminal j is found for which the weight $W_j(n)$ is greatest. In the event of a tie, any of various methods, such as random choice, can be used to make a definite selection. At block 90, timeslot n is assigned to remote terminal j.

Advantageously, remote terminal j is scheduled for service only if it is active; that is, only if it has queued data. If scheduling is limited to active terminals only, then it may be advantageous to also limit the weight-function computation of block 70 to active terminals only.

At block 100, the average rate $R_i(n)$ for each remote terminal is updated to $R_i(n+1)$. The timeslot index has been incremented because the updated value will be used to compute the weight for the next timeslot. As noted above, $R_i(n)$ is an average computed over some appropriate length of time. One useful averaging method in this regard is exponentially weighted averaging with a time constant $\tau$. An exemplary time constant is 1024 timeslots, which in typical CDMA networks is equivalent to 1.71 seconds.

According to the techniques of exponentially weighted averaging, $R_i(n)$ is updated according to the following:

$$R_i(n+1) = \left(1 - \frac{1}{\tau}\right) R_i(n) + \frac{1}{\tau} r_i(n).$$

In the preceding expression, $r_i(n)$ is the rate of transmission to remote terminal i in timeslot n. This rate $r_i(n)$ will typically take the value $DRC_i(n)$ if remote terminal i is being served, and otherwise will take the value zero.

It should be noted that the selection of a time constant depends on the maximum length of time during which an individual remote terminal can tolerably be denied service. That is, a sudden drop in the quality of the channel to a given remote terminal will elicit from that terminal a low DRC, which will result in a low weight for that remote terminal and concomitant denial of service, until a rise in the token count and a drop in $R_i$ are sufficient to compensate for the drop in DRC. The larger the time constant, the longer it will take $R_i$ to decay to a low value. On the other hand, throughput is benefited when $R_i$ decays slowly, because in that case service will be withheld from remote terminal i for a relatively long period of time, during which the channel has a chance to recover.

At block 110, the token count $T_i(n)$ for each remote terminal is updated to $T_i(n+1)$. The updating of the token count is described by the following:

$$T_i(n+1) = T_i(n) + X_i(n) - r_i(n).$$

The term $X_i(n)$ in the preceding expression takes on different values, depending on the sign of $T_i(n)$. If $T_i(n)$ is positive or zero, $X_i(n)$ takes on the value $R_i^{min}$, which is a desired floor, or lower limit, on the average transmission rate for user i. This floor may be set differently for each remote terminal i. If $T_i(n)$ is negative, $X_i(n)$ takes on the value $R_i^{max}$, which is a desired ceiling, or upper limit, on $R_i$. This ceiling may also be set differently for each remote terminal i. These settings may be made in accordance, e.g., with contracted levels of service for the users who correspond to the respective remote terminals.

Figure 2:
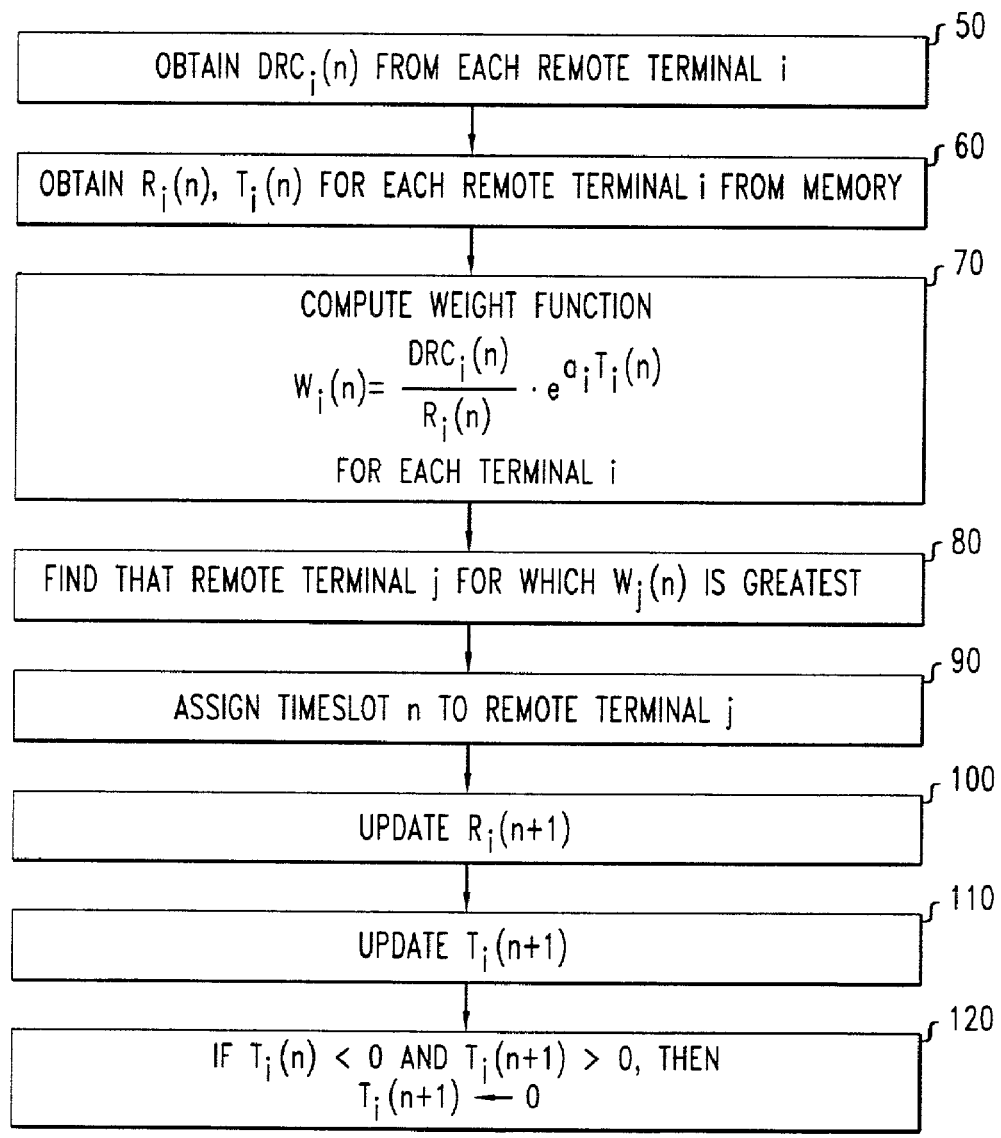
FIG. 2 is a flowchart of an illustrative sequence of steps performed by a scheduler during the n'th timeslot according to the invention in one embodiment.

Although it is not absolutely required, we have found through numerical simulations that the step represented by block 120 of FIG. 2 tends to improve the performance of the algorithm. At block 120, if the token counter had a negative value at time n and a positive value at time n+1, then the counter is reset to zero in timeslot n+1.

For some or all of the remote terminals, it may be desirable to set a floor without setting a corresponding ceiling. This is readily achieved, in effect, simply by setting the ceiling to an extremely high value, and retaining the reset feature of block 120. If that reset feature is omitted, then operation without a ceiling is readily achieved by immediately resetting the token counter to zero any time it goes negative.

Figure 3:
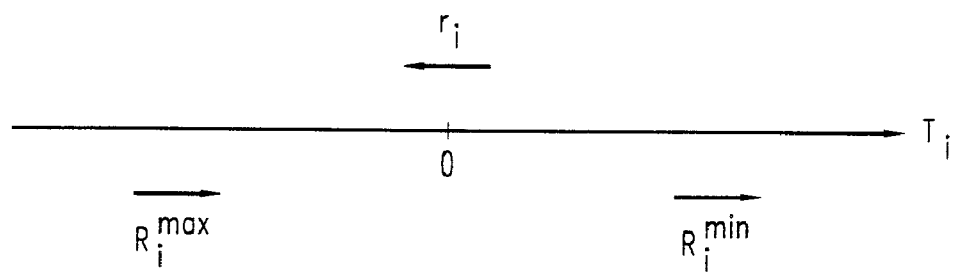
FIG. 3 is a number line illustrating the effect of the token counter for a given remote terminal according to the invention in an illustrative embodiment. Each point on the number line represents a possible value for the token counter. The present value of the token counter, as represented by a point on the number line, is referred to here as the "operating point."

The effect of the token counter for a given remote terminal is conveniently described with reference to FIG. 3. FIG. 3 is a number line, each point of which represents a possible value for the token counter. The present value of the token counter, as represented by a point on the number line, will be referred to here as the "operating point." Displacement of the operating point to the right tends to increase the frequency of service to the remote terminal, whereas displacement to the left tends to decrease the frequency of service. In each timeslot, the net change in the operating point is the resultant of a shift to the right by one of the two possible values of $X_i$, and—only if the remote terminal has been served—a shift to the left by the pertinent rate, which for purposes of illustration is assumed to be the pertinent DRC.

Thus, if the operating point is to the right of zero and, on average, the remote terminal is being served at a rate less than $R_i^{min}$, the operating point will continue shifting to the right until the average rate of service equals $R_i^{min}$. At that point, a state of statistical equilibrium will be reached, and the operating point will remain approximately stationary on a timescale, typically, of seconds.

On the other hand, if the remote terminal is being served at an average rate greater than $R_i^{min}$, the operating point will shift leftward until either: (1) the average rate of service drops to $R_i^{min}$, thus achieving equilibrium, or (2) if the average service rate is also greater than $R_i^{max}$, the operating point crosses zero. If the operating point crosses zero, it will continue to shift leftward until the average rate of service drops to $R_i^{max}$, and equilibrium is achieved. If the average rate of service lies between $R_i^{min}$ and $R_i^{max}$, then once the operating point reaches the vicinity of zero, it will go on oscillating about zero.

If no effective ceiling $R_i^{max}$ is to be imposed, then either of the approaches described above will have the effect that once the operating point reaches zero, it will stay close to zero so long as the average rate of service is at least $R_i^{min}$.

Those skilled in the art will appreciate that the boundary between the regime of incrementation by $R_i^{min}$ and the regime of incrementation by $R_i^{max}$ can be shifted from zero by including an additive constant in the token count. For purposes of defining the present invention, an embodiment of the invention resulting from any such modification is deemed equivalent to the described embodiment.

Those skilled in the art will also appreciate that our method may be practiced using various embodiments of a token counter alternative to that described here. For example, the token counter $T_i(n)$ described above may be replaced by a pair of token counters $G_i(n)$, $H_i(n)$, and the weight function described above replaced by an expression such as $$W_i(n) = \frac{DRC_i(n)}{R_i(n)} e^{a_i G_i(n) - b_i H_i(n)},$$

where the argument of the increasing, e.g. exponential, function is now a weighted sum of the two token counters. In the preceding expression, $G_i(n)$ is decremented by $r_i(n)$, as above, and $H_i(n)$ is incremented by $r_i(n)$, whenever the pertinent remote terminal is served. In each timeslot, $G_i(n)$ is incremented by the floor amount, and $H_i(n)$ is decremented by the ceiling amount. Negative values of $G_i(n)$ and $H_i(n)$ are reset to zero.

It is well known that the Proportional Fair scheduling algorithm has the optimality property that it maximizes the quantity $$\sum_i \log(R_i),$$

wherein the summation is taken over all remote terminals i. More precisely, in the asymptotic limit of infinite averaging time τ, the quantity $$\sum_i \log(R_i)$$

resulting from Proportional Fair scheduling can be no less than that resulting from any other scheduling algorithm. In that sense, over the long term, when total throughput for all remote terminals is taken into account, no other scheduling algorithm can do better than Proportional Fair scheduling. We consider it likely that when the scheduling is constrained by floors $R_i^{min}$ and ceilings $R_i^{max}$ on the average rates of service to the individual remote terminals, our new algorithm will have an optimality property of the same form; i.e., that it maximizes the quantity $$\sum_i \log(R_i)$$

subject to the floor and ceiling constraints.

In an alternate embodiment of the invention, it is the throughput $$\sum_i R_i$$

rather than $$\sum_i \log(R_i)$$

that is optimized subject to the floor constraint or to the floor and ceiling constraints. In this alternate embodiment, the weight function for the i'th remote terminal is, e.g., $DRC_i(n)e^{a_i T_i}$. (The argument n has been omitted here for brevity.)

In a broader aspect, the invention includes within its scope methods for optimizing various measures of network performance that all share the step of selecting the hightest-weighted remote terminal for service in each pertinent timeslot. If the performance measure is denoted $F(R_1, \ldots, R_N)$, then in each case the weight function for the i'th remote terminal is the product of $$\frac{\partial F}{\partial R_i}$$

times $e^{a_i T_i}$, or else it is the product of $$\frac{\partial F}{\partial R_i}$$

times some other increasing, preferably convex, function of one or more token counters.

In each such instance, the i'th component $$\frac{\partial F}{\partial R_i}$$

of the gradient function $$\left( \frac{\partial F}{\partial R_1}, \ldots, \frac{\partial F}{\partial R_N} \right)$$

relates the i'th remote terminal to overall network performance. In the examples given above $$\frac{1}{R_i}$$

and 1 are the i'th components of the gradient function for particular choices of the function $F(R_1, \ldots, R_N)$, namely, $$F(R_1, \ldots, R_N) = \sum_{i=1}^{N} \log(R_i) \text{ and } F(R_1, \ldots, R_N) = \sum_{i=1}^{N} R_i,$$

respectively.

What is claimed is:

1. A method for scheduling transmissions between a central hub and a plurality of remote terminals of a communication network, comprising:
   a) in at least one timeslot, assigning to each of the remote terminals a respective weight that is directly proportional to a gradient function relating the pertinent remote terminal to a measure of network performance; and
   b) selecting the highest-weighted remote terminal as the terminal to be served in the next transmission to be scheduled, CHARACTERIZED IN THAT
   c) each of the remote terminals has at least one associated token count that is incremented periodically and decremented when the pertinent remote terminal is served; and
   d) the respective weight assigned to each remote terminal is also directly proportional to an increasing function of at least one pertinent token count;
   e) the method further comprises, at least once, updating a respective token count associated with each of the remote terminals;
   the updating step comprises incrementing the pertinent token count by a quantity X and conditionally decrementing said count by a quantity r; and
   said count is decremented only on condition that the pertinent remote terminal has been served in the timeslot preceding the timeslot in which the updated token count will take effect.

2. The method of claim 1, wherein for a given remote terminal, the gradient function is directly proportional to a selected transmission rate between the hub and the pertinent remote terminal, and inversely proportional to an average transmission rate between said hub and said terminal.

3. The method of claim 1, wherein for a given remote terminal, the gradient function is a selected transmission rate between the hub and the pertinent remote terminal.

4. The method of claim 1, wherein r represents the amount of data transmitted while serving the pertinent remote terminal in the pertinent timeslot.

5. The method of claim 1, wherein for at least one updating step for at least one remote terminal, X is a target lower limit on an average amount of data transmitted per timeslot between the hub and the pertinent remote terminal.

6. The method of claim 1, wherein for at least one updating step for at least one remote terminal, X is a target upper limit on an average amount of data transmitted per timeslot between the hub and the pertinent remote terminal.

7. The method of claim 1, wherein for each of the remote terminals:

X is a respective target lower or upper limit on an average amount of data transmitted per timeslot between the hub and the pertinent remote terminal;

X is a lower limit if the current token count for the pertinent remote terminal has a positive value; and X is an upper limit if said count has a negative value.

8. The method of claim 7, wherein:

for each of the remote terminals, the updating step further comprises conditionally resetting the pertinent token count to zero; and said count is reset to zero only if said incrementing and decrementing of said count have had the net effect of shifting said count from a negative to a positive value.

9. The method of claim 1, wherein:

for each of the remote terminals, the updating step further comprises conditionally resetting the pertinent token count to zero; and said count is reset to zero only if said incrementing and decrementing of said count have had the net effect of shifting said count from a negative to a positive value.

10. The method of claim 9, wherein:

X is a respective target lower limit or a nominal upper limit on an average amount of data transmitted per timeslot between the hub and the pertinent remote terminal;

X is the lower limit if the current token count for the pertinent remote terminal has a positive value;

X is the nominal upper limit if said count has a negative value; and the nominal upper limit is set so high that it does not effectively limit said average amount of data.

11. The method of claim 1, wherein:

for each of the remote terminals, X is a target lower limit an average amount of data transmitted per timeslot between the hub and the pertinent remote terminal; and the updating step further comprises resetting the pertinent token count to zero if the net effect of incrementing and decrementing said count was to shift it from a non-negative value to a negative value.

12. The method of claim 1, wherein the increasing function is a convex function.

13. The method of claim 1, wherein the increasing function is an exponential function.

14. The method of claim 1, wherein the communication network is a wireless radiofrequency communication network, and the transmissions to be scheduled are downlink transmissions from a base station to the respective remote terminals.

15. The method of claim 1, wherein the communication network is a wireless radiofrequency communication network, and the transmissions to be scheduled are uplink transmissions to a base station from the respective remote terminals.

* * * * *